United States Patent [19]
Ashmore et al.

[11] Patent Number: 5,971,048
[45] Date of Patent: Oct. 26, 1999

[54] PNEUMATIC TIRE WITH ASYMMETRIC TREAD PROFILE

[75] Inventors: Stephen Michael Ashmore, Greenwood; Firdos Phiroz Avari, Birmingham, both of United Kingdom

[73] Assignee: Sumitomo Rubber Industries Limited, Hyogo-ken, Japan

[21] Appl. No.: 08/899,480

[22] Filed: Jul. 24, 1997

[30] Foreign Application Priority Data

Jul. 26, 1996 [GB] United Kingdom .................... 9615723

[51] Int. Cl.$^6$ ................ B60C 3/06; B60C 9/30; B60C 11/00; B60C 11/01
[52] U.S. Cl. .......................... 152/209 RR; 152/209 AS; 152/454; 152/455; 152/456; 152/531; 152/533; 152/551; 152/554; 152/555
[58] Field of Search ............... 152/209 A, 454–456, 152/531, 533, 551, 554, 555, 209 R, 209 RR, 209 AS; 156/123 A; 1/1

[56] References Cited

U.S. PATENT DOCUMENTS

| 4,840,210 | 6/1989 | Kukimoto | 152/209 A |
| 5,735,979 | 4/1998 | Secondari | 152/456 X |

FOREIGN PATENT DOCUMENTS

| 0755808 | 1/1997 | European Pat. Off. | 152/456 |
| 6-64408 | 3/1994 | Japan | 152/209 A |
| 8-258512 | 10/1996 | Japan | 152/455 |
| 2205283 | 12/1988 | United Kingdom | 152/455 |

*Primary Examiner*—Adrienne Johnstone
*Attorney, Agent, or Firm*—Birch, Stewart Kolasch & Birch, LLP

[57] ABSTRACT

A pneumatic radial tire has a carcass extending around the tire from bead-to-bead, sidewalls and a rubber tread region which has a profile, when considered in transverse cross section, of a new tire terminating at the sides of the tread in inner and outer shoulder regions, respectively, each shoulder region having a shoulder drop, which is the distance, in the radially inward direction, from the point of maximum tire diameter to a point of the shoulder at the edge of the shoulder region, such that when the tire is mounted on a scheduled wheel rim and inflated to a scheduled pressure, the tread region is asymmetric, having its point of maximum tire diameter offset in the axial direction of the tire from the center line of the tire section in the direction of the inner shoulder, and the shoulder drop of the outer shoulder is greater than the shoulder drop of the inner shoulder such that the tread region has an asymmetric profile, wherein the tread region has a substantially constant tread gauge or thickness except at the inner shoulder which has a locally reduced tread gauge or thickness so that the inner shoulder profile is trimmed.

10 Claims, 1 Drawing Sheet

PNEUMATIC TIRE WITH ASYMMETRIC TREAD PROFILE

BACKGROUND OF THE INVENTION

This present invention relates to a pneumatic tire for passenger cars and more particularly to tires for racing and similar very light performance uses.

Conventionally tires have a symmetrical tread profile when considered in cross-section to show the curvature in the radial plane.

Proposals have been made to use different tread compounds at either side of the tire for improving wet grip and to use different tread pattern groove layouts at either side of the tread to provide some asymmetry. The latter also gives increased pattern density on the outside half of the tire to improve cornering when that part of the tire is carrying most of the cornering forces. However, there is a reduction in the tire's wet grip ability due to poorer drainage.

Conventional tires use dual radii tread profiles. The central region of the tread has one large radius and the shoulders have a second substantially smaller radius. This is to provide a wider flatter tread with a more uniform contact patch to the road. Japanese Patent publication 3271003 proposed an asymmetrical profile shape in which the outer part of the tread of the tire, when fitted to a vehicle, has a smaller radius than the inner part to allegedly improve the wet grip ability of the tire.

U.S. Pat. No. 4,763,708 proposes that the transverse sectional plane has a maximum outer diameter point spaced axially from the central plane of the tread and the radius of curvature of the narrower side is greater than the other side to improve the resistance to abrasion of the shoulder regions.

It has also been proposed to stiffen the inboard sidewall of the tire so that more load is carried by that sidewall to offset some of the load transfer during cornering. However, but the bulk of the material in the stiffened sidewall increases heat generation leading to durability problems.

However the above tires do not optimize contact patch load distribution while cornering and thus lateral grip and handling are not optimized and uneven wear occurs. Furthermore for high cornering powers known tires are very wide which increases cost and leads to installation problems on vehicles. Another proposal provides a pneumatic tire having a tread region which has a profile, when considered in transverse cross-section of a new tire terminating at the sides of the tread in inner and outer shoulder regions respectively, wherein each said shoulder region has a shoulder drop, which is the distance in the radially inward direction from the point of maximum tire diameter to a shoulder point at the edge of the shoulder region, wherein when the tire is mounted on its scheduled rim and inflated to its scheduled pressure the tread region is asymmetric having its point of maximum tire diameter offset in the axial direction of the tire from the center line of the tire section in the direction of the inner shoulder edge, and the shoulder drop of the outer shoulder is greater than the shoulder drop of the inner shoulder such that the tread region has an asymmetrical profile.

Such a tire provides a substantial improvement in vehicle handling but still further improvements in handling and also in fatigue performance are desired.

SUMMARY OF THE INVENTION

Accordingly the present invention provides a pneumatic radial tire having a carcass extending around the tire from bead to bead, sidewalls and a rubber tread region which has a profile, when considered in transverse cross section, of a new tire terminating at the sides of the tread in inner and outer shoulder regions respectively, each shoulder region having a shoulder drop, which is the distance in the radially inward direction from the point of maximum tire diameter to a point of the shoulder at the edge of the shoulder region, such that when the tire is mounted on a scheduled wheelrim and inflated to a scheduled pressure, the tread region is asymmetric, having its point of maximum tire diameter offset in the axial direction of the tire from the center line of the tire section in the direction of the inner shoulder, and the shoulder drop of the outer shoulder is greater than the shoulder drop of the inner shoulder such that the tread region has an asymmetrical profile, wherein the tread region has a substantially constant tread gauge or thickness except at the inner shoulder which has a locally reduced tread gauge or thickness so that the inner shoulder profile is trimmed.

The ratio of the shoulder drop of the outer shoulder to the shoulder drop of the inner shoulder may be greater than 1.25 and preferably it is in the range of 1.25 to 5.

The region of reduced tread gauge preferably has a width measured axially of the tire in the range of 5% to 12% of the tire sectional width and more preferably 10%. In addition the tire reinforcement structure may be asymmetric and this may be a asymmetric breaker construction providing greater tread reinforcement in the region of reduced tread gauge.

The breaker reinforcement may comprise a wound strip of longitudinally reinforced breaker fabric lying at substantially 0° with respect to the circumferential direction. The greater reinforcement in the region adjacent to the reduced tread gauge portion may be obtained by overlapping adjacent windings.

The tire carcass may also be asymmetric and in one such construction a filler is provided in each sidewall. In a preferred construction the filler comprises an aramid reinforced fabric ply which begins under the edge of the breaker, extends around the carcass and is wrapped around the bead core. The filler strip in one sidewall then has a turnup portion which reaches beyond the apex strip, i.e. towards the mid-sidewall region, whereas the filler strip in the sidewall which reaches to the region of reduced gauge has its filler strip terminating at the bead.

DESCRIPTION OF THE DRAWING

Further applications of the invention will be apparent from the following description as an embodiment of the present invention by way of example in conjunction with the attached diagrammatic drawing, wherein.

DETAILED DESCRIPTION OF THE INVENTION

Figure 1:
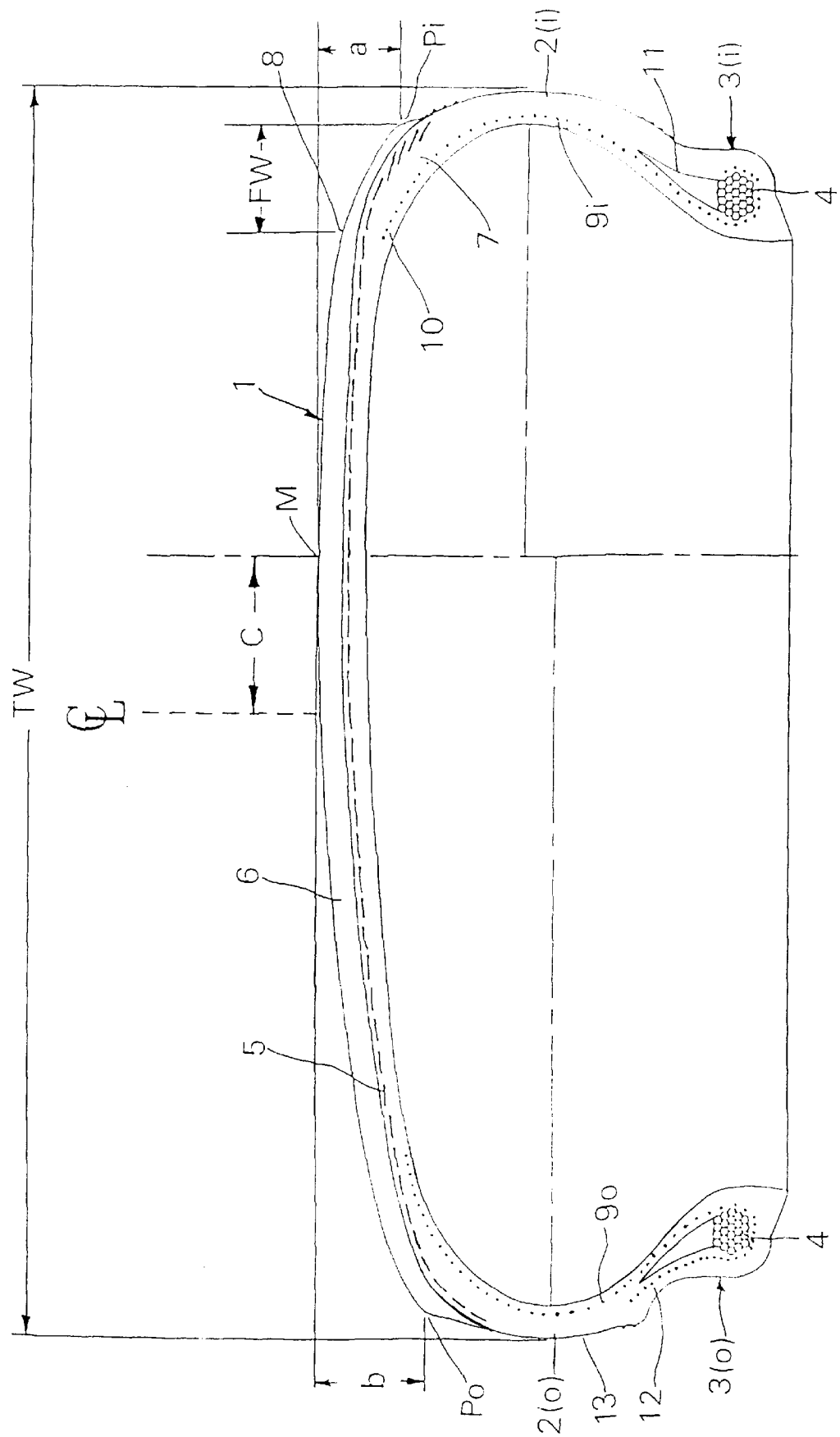
FIG. 1 shows a transverse cross-sectional view of a tire.

The tire shown in FIG. 1 is a 210/650R19 having a bead diameter of 403.1 mm to suit a 19" wheel rim. The tire includes a tread region 1, inner and outer sidewalls 2i and 2o respectively, inner and outer bead regions 3i and 3o respectively, and bead reinforcement cores 4, one disposed in each bead. The tire is reinforced by a radial carcass (not shown) and a breaker reinforcement 5 which will be described later. The breaker reinforcement 5 lies beneath a tire tread 6 made of a rubber compound.

By the terms inner and outer as applied herein to components or elements of the tire is meant respectively nearer to or further away from the vehicle longitudinal centerline when the tire is mounted on the vehicle. The tire is preferably provided with an indicator or other means to enable it to be mounted with the correct orientation with respect to the vehicle.

The above features of the tire are basically the same as a conventional tire of this size, but as can be seen from the drawing the tire is in fact not symmetrical and has an asymmetric profile in the tread region, different length sidewalls and an asymmetric reinforcement structure, each of which will be described.

The profile of the tire is offset in that the maximum tire diameter MTD is located on the tread outer surface at a point M axially displaced by a distance C from the intersection with the axial centerline CL. The curvature of the tread surface to the other side of the point M is the same. Accordingly considering the inboard side of the tire, which is the right-hand side in FIG. 1, the shoulder drop a, which is defined as the distance in the radial direction between the point M on the tread surface of the maximum tire diameter and the shoulder point Pi of the shoulder region 7, is as shown. The shoulder drop b of the outside should point Po of the tire is measured in a similar way and can be seen to be larger than a. When considered in its inflated mounted condition the shoulder drops a and b being different provide the asymmetric construction. In the present tire the shoulder drops are a=13 mm and b=20 mm, respectively While the curvature of the tread to either side of the point M begins at the same value, the tread surface lying to the right of point M has a single curvature, whereas the tread surface lying to the left of the point has firstly a first curvature and then two additional radii. This variation of radius together with the additional width of the tire to the left of point M generates the shoulder drop measured.

The tread profile on the inboard shoulder, i.e. the right-hand side in FIG. 1, is modified by means of the thickness of the tread 6 being reduced substantially compared with the thickness across the remainder of the tire width which thickness is substantially constant. Thus for an axial distance FW measured from the shoulder point Pi inwards of the tire the thickness of the tread strip 6 is substantially reduced. The axial width FW is in this embodiment 10% of the total tire width TW. It has been found that this reduced gauge region preferably has a width in the range of 5% to 12% of the total width TW of the tire.

The breaker construction for the tire comprises a strip winding, sometimes known as JLB or Jointless Bandage winding, of a strip of cord reinforced fabric. The reinforcement comprises an aramid cord with twelve cords per strip and the strip is 10 mm wide. The reinforced strip is wound circumferentially around the tire to provide a reinforcement ply for the breaker having aramid cords substantially at 0° to the centerline of the tread. Successive windings of the strip are positioned in edge-to-edge contact from the outside of the tire across the centerline but in the inboard shoulder region 7 the strips are wound with an overlapping relationship to provide additional reinforcement adjacent and radially inwards of the reduced gauge region between points 8 and Pi.

As will be appreciated the tire sidewalls 2i and 2o are of different lengths, the outboard sidewall 2o being the shorter. Both sidewalls are reinforced by an aramid cord reinforced filler strip. In the inboard sidewall 2i the aramid reinforced filler 9i extends from a point 10 under the breaker reinforcement around the tire section to its carcass, wraps around the bead core 4 and terminates adjacent to the joint of the bead core 4 at apex strip 11. In the outboard sidewall 2o the filler strip 9i begins again under the edge of the breaker 5, extends around the bead core 4 but continues as a filler turnup 12 axially outside the bead and apex and terminates midway between the bead core and the point of maximum tire section width 13. Thus in the outboard sidewall the filler strip provides increased reinforcement giving a sidewall having greater stiffness than the inboard sidewall.

In use of the tire it is important that the tire is fitted to the vehicle with the inboard and outboard sidewalls in the correct position. The region of reduced tread gauge then acts to provide in effect a trimmed shoulder which modifies the contact pressure of the tire in heavy cornering of the vehicle. This region together with the asymmetric reinforcement provides a tire having effectively an inner sidewall height increased by approximately 8 mm. This combination with the other asymmetric features provides effectively on a vehicle a camber of 2.5° negative without needing to set the suspension and the result in high speed cornering, such as in car racing conditions, provides increased corner grip. The tire has been found to have, in addition increased fatigue life, better temperature distribution across the tread and greater consistency.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

Having now described our invention what we claim is:

1. A pneumatic radial tire comprising a carcass extending around the tires from bead-to-bead, sidewalls and a rubber tread region which has a profile, when considered in transverse cross section, of a new tire terminating at the sides of the tread in inner and outer shoulder regions, respectively, each said shoulder region having a shoulder drop, which is the distance in the radially inward direction from the point of maximum tire diameter to a point in the shoulder at the edge of the shoulder region, such that when the tire is mounted on a scheduled wheel rim and inflated to a scheduled pressure, the tread region is asymmetric, having its point of maximum tire diameter offset in the axial direction of the tire from the center line of the tire section in the direction of the inner shoulder, and the shoulder drop of the outer shoulder is greater than the shoulder drop of the inner shoulder such that the tread region has an asymmetrical profile, wherein the tread region has a substantially constant tread gauge or thickness except at the inner shoulder which has a locally reduced tread gauge or thickness whereby the inner shoulder profile has a trimmed configuration.

2. The pneumatic radial tire according to claim 1, wherein the region of reduced gauge has a width measured axially of the tire in the range of 5% to 12% of the tire section width.

3. The pneumatic radial tire according to claim 1, wherein the region of reduced gauge has a width measured axially of the tire which is 10% of the tire section width.

4. The pneumatic radial tire according to claim 1, wherein the tire has an asymmetric breaker reinforcement for the tread region having increased reinforcement in the region adjacent to and radially inward of the reduced gauge part of the inner shoulder.

5. The pneumatic radial tire according to claim 4, further comprising a bead core and bead apex in each bead, wherein the carcass of the tire has asymmetric reinforcement including in each sidewall a filler comprising an aramid cord reinforced strip which extends from under the breaker reinforcement of the tire parallel to the tire carcass to the tire bead, the filler in the sidewall on the inner side of the tire where the region of reduced tread gauge is provided terminating at its radially inward edge adjacent to the bead core and the filler in the outer tire sidewall terminating above the tire bead apex so as to lie midway between the point of maximum tire section width and the bead core and provide a stiffened sidewall compared to the inner sidewall.

6. The pneumatic radial tire according to claim 4, wherein the breaker reinforcement comprises a wound strip of longitudinally reinforced breaker fabric lying at substantially 0° to the circumferential direction and a larger number of windings per unit breaker width are provided in the region adjacent to and radially inwards of the reduced gauge part of the inner shoulder.

7. The pneumatic radial tire according to claim 6, wherein the large number of windings is obtained by overlapping adjacent windings.

8. The pneumatic radial tire according to claim 6, wherein the breaker fabric is reinforced with aramid.

9. The pneumatic radial tire according to claim 1, wherein the tire is provided with an indicator or other means to enable it to be mounted correctly on a vehicle such that the inner shoulder is nearer to the vehicle longitudinal center line.

10. A vehicle having at least two tires mounted thereon, the tires each comprising a carcass extending around the tire from bead-to-bead, sidewalls and a rubber tread region which has a profile when considered in transverse cross section of a new tire terminating at the sides of the tread in inner and outer shoulder regions, respectively, each said shoulder region having a shoulder drop, which is the distance in the radially inward direction from the point of maximum tire diameter to a point in the shoulder at the edge of the shoulder region, such that in the tire, mounted on a scheduled wheel rim and inflated to a scheduled pressure, the tread region is asymmetric, having its point of maximum tire diameter offset in the axial direction of the tire from the center line of the tire section in the direction of the inner shoulder, and the shoulder drop of the outer shoulder is greater than the shoulder drop of the inner shoulder such that the tread region has an asymmetrical profile, wherein the tread region has a substantially constant tread gauge or thickness except at the inner shoulder which has a locally reduced tread gauge or thickness whereby the inner shoulder profile has a trimmed configuration.

* * * * *